US012695686B2

(12) United States Patent
Raghavan et al.

(10) Patent No.: US 12,695,686 B2
(45) Date of Patent: Jul. 28, 2026

(54) METHOD, SYSTEM CONTROLLER, AND COMPUTER PROGRAM FOR SELECTION OF SYSTEM OPERATIONAL ACTION IN A COMMUNICATION SYSTEM

(71) Applicant: Telefonaktiebolaget LM Ericsson (publ), Stockholm (SE)

(72) Inventors: Ajit Raghavan, New Delhi (IN); Farman Ali Khan, Gurgaon (IN); Hemant Goyal, Gurgaon (IN); Manish Pawar, Indore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 18/705,031

(22) PCT Filed: Oct. 26, 2021

(86) PCT No.: PCT/IN2021/051014

§ 371 (c)(1),
(2) Date: Apr. 26, 2024

(87) PCT Pub. No.: WO2023/073723

PCT Pub. Date: May 4, 2023

(65) Prior Publication Data

US 2025/0274366 A1 Aug. 28, 2025

(51) Int. Cl.
*H04L 43/0817* (2022.01)
*H04L 41/0631* (2022.01)
*H04L 43/0888* (2022.01)

(52) U.S. Cl.
CPC ...... *H04L 43/0817* (2013.01); *H04L 41/0631* (2013.01); *H04L 43/0888* (2013.01)

(58) Field of Classification Search
CPC ............. H04L 43/0817; H04L 41/0631; H04L 43/0888
See application file for complete search history.

(56) References Cited

U.S. PATENT DOCUMENTS 10,402,723 B1 * 9/2019 Silberman .............. G06N 3/006
10,474,955 B1 * 11/2019 Santhanam ............. H04L 41/16
(Continued)

FOREIGN PATENT DOCUMENTS

WO 2013149870 A1 10/2013
WO 2020014569 A1 1/2020
WO WO-2021045225 A2 * 3/2021 ............. G06N 3/084

OTHER PUBLICATIONS

Extended European Search Report, European Patent Application No. 21962294.1, mailed Oct. 31, 2024, 10 pages.
(Continued)

*Primary Examiner* — Philip C Lee
(74) *Attorney, Agent, or Firm* — Sage Patent Group

(57) ABSTRACT

There is provided mechanisms for selection of system operational action in a communication system. A method is performed by a system controller. Operation and maintenance data identifying current system conditions in the communication system is obtained. Based on the obtained operation and maintenance data, a set of system operational actions that are candidates to be performed is determined. Each of the system operational actions impacts system operational characteristics of the communication system according to quantitative outcomes with associated probabilities. Each of the system operational actions provides a system operation utility in the communication system. A utility score is determined for each of the system operational actions. The system operational action with highest utility score is selected. Execution of the selected system operational action is initiated in the communication system.

17 Claims, 8 Drawing Sheets

(56)  References Cited

U.S. PATENT DOCUMENTS

| | | |
|---|---|---|
| 2017/0310542 A1 | 10/2017 | Nair et al. |
| 2020/0167255 A1* | 5/2020 | Gudka ................... H04L 43/50 |
| 2020/0186411 A1 | 6/2020 | Ravichandran et al. |
| 2021/0109789 A1* | 4/2021 | McWeeney ........... G06F 9/5022 |
| 2022/0210789 A1* | 6/2022 | Bellamkonda ........ H04W 88/06 |
| 2025/0051289 A1* | 2/2025 | Wayne ................ G06N 3/0442 |

OTHER PUBLICATIONS

International Search Report and Written Opinion of the International Searching Authority, PCT/IN2021/051014, mailed Jan. 19, 2022, 12 pages.
Kahneman, Daniel et al., "Prospect Theory: An Analysis of Decision under Risk," Econometrica, vol. 47, No. 2, Mar. 1979, 30 pages.

* cited by examiner

100

S102
Obtain operation and maintenance data

S104
Determine candidate set of network actions

S106
Determine utility score for each of the network actions

S108
Select network action with highest utility score

S110
Initiate execution of selected network action

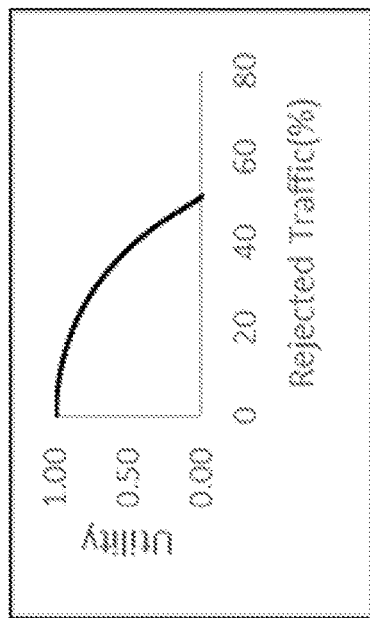
Utility of Rejected Traffic
$$u_{RT}(x) = \begin{cases} 2 - e^{-0.00027x2}, & 0 \le x > 50 \\ 0, & x \ge 50 \end{cases}$$
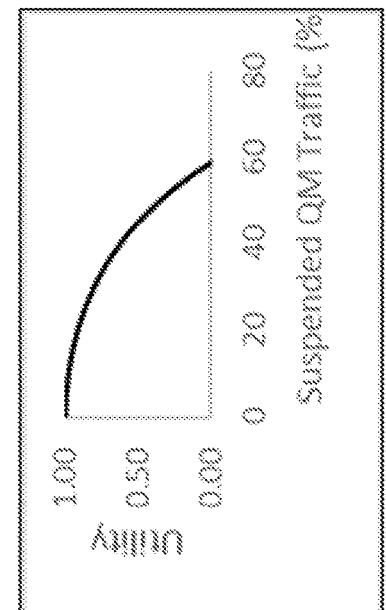
Utility of Suspended QM Traffic
$$u_{ST}(x) = \begin{cases} 2 - e^{-0.0002x2}, & 0 \le x > 60 \\ 0, & x \ge 60 \end{cases}$$
Utility of Latency
$$u_{LT}(x) = \begin{cases} 1 - 0.02x, & 0 \le x > 50 \\ 0, & x \ge 50 \end{cases}$$
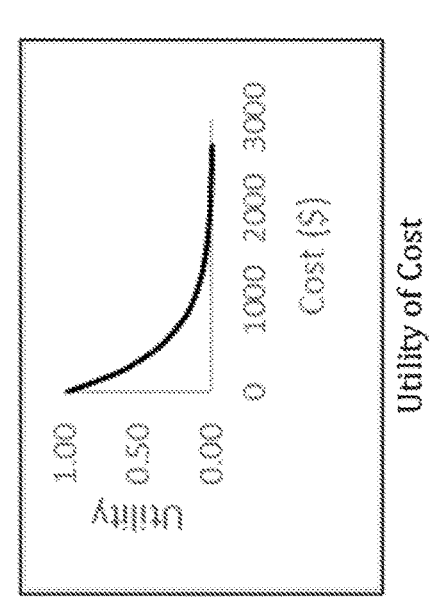
Utility of Cost
$$u_{CT}(x) = \begin{cases} e^{-0.002x}, & 0 \le x > 2500 \\ 0, & x \ge 2500 \end{cases}$$
Fig. 3

| Attributes ↓ | | Scaling | Load Regulation | Suspend QM |
|---|---|---|---|---|
| Latency | Outcomes with probabilities | $p_{RT}(x) = \frac{1}{\sigma\sqrt{2\pi}} e^{-\frac{(x-\mu)^2}{2\sigma^2}}$, $\mu = 15$, $\sigma = 3$ | $p_{RT}(x) = \frac{1}{\sigma\sqrt{2\pi}} e^{-\frac{(x-\mu)^2}{2\sigma^2}}$, $\mu = 10$, $\sigma = 3$ | $p_{LT}(x) = \frac{1}{\sigma\sqrt{2\pi}} e^{-\frac{(x-\mu)^2}{2\sigma^2}}$, $\mu = 20$, $\sigma = 3$ |
| | Utility score | $U_{LT} = \int_{-\infty}^{\infty} u_{LT}(x) \cdot p_{LT}(x) \cong 0.7$ | $U_{LT} = \int_{-\infty}^{\infty} u_{LT}(x) \cdot p_{LT}(x) \cong 0.7996$ | $U_{LT} = \int_{-\infty}^{\infty} u_{LT}(x) \cdot p_{LT}(x) \cong 0.6$ |
| Rejected Traffic | Outcomes with probabilities | Rejected Traffic = 0%, $p_{RT} = 1$ | $p_{RT}(x) = \frac{1}{\sigma\sqrt{2\pi}} e^{-\frac{(x-\mu)^2}{2\sigma^2}}$, $\mu = 35$, $\sigma = 4$ | Rejected Traffic = 0%, $p_{RT} = 1$ |
| | Utility score | $U_{RT} = u_{RT}(0), p_{RT} = 1$ | $U_{RT} = \int_{-\infty}^{\infty} u_{RT}(x) \cdot p_{RT}(x) \cong 0.5979$ | $U_{RT} = u_{RT}(0), p_{RT} = 1$ |
| ⋯ | | | | |

Fig. 4

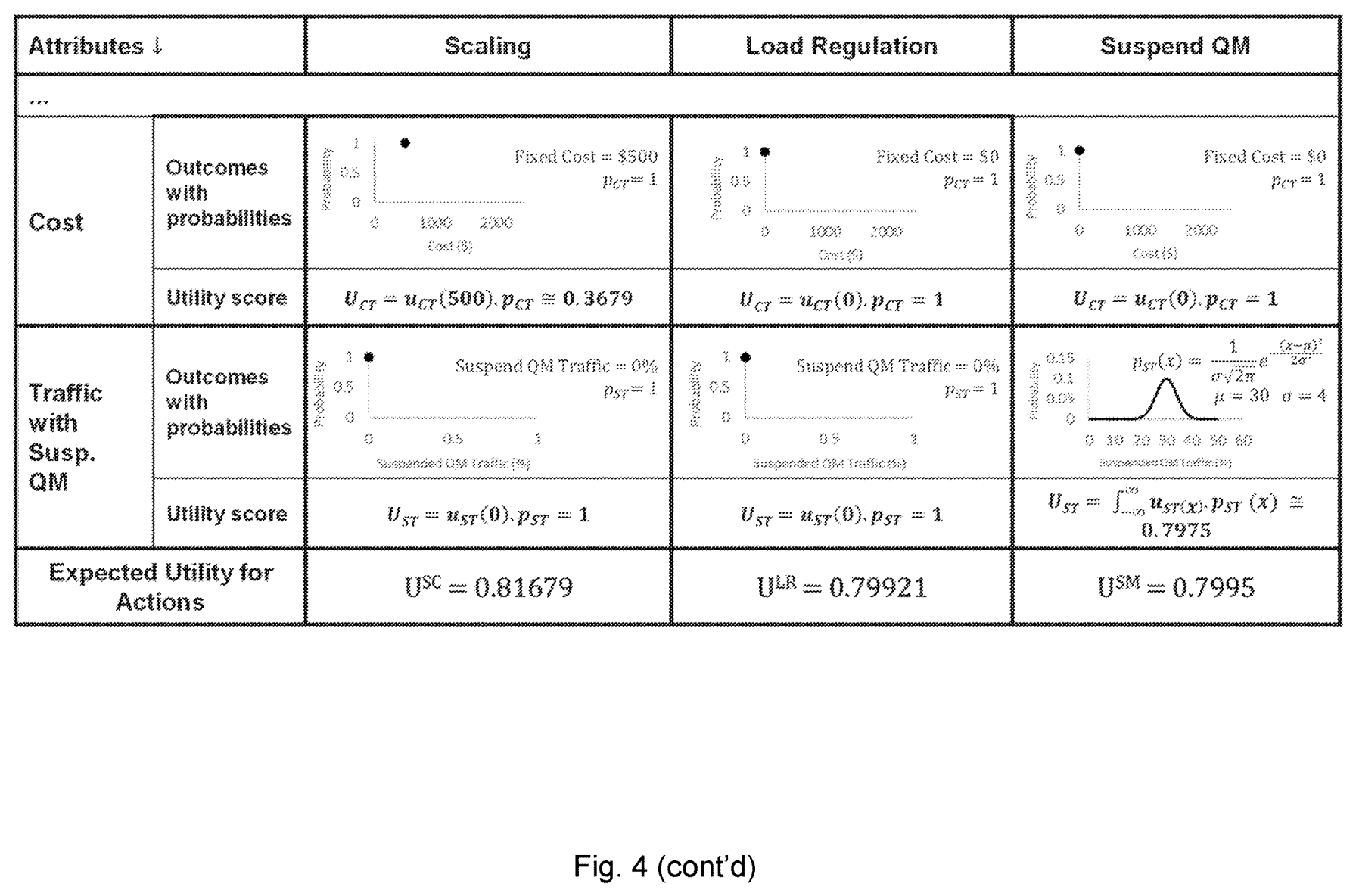

| Attributes i | | Scaling | Load Regulation | Suspend QM |
|---|---|---|---|---|
| Cost | Outcomes with probabilities | Fixed Cost = $500, $p_{CT} = 1$ | Fixed Cost = $0, $p_{CT} = 1$ | Fixed Cost = $0, $p_{CT} = 1$ |
| | Utility score | $U_{CT} = u_{CT}(500) \cdot p_{CT} \cong 0.3679$ | $U_{CT} = u_{CT}(0) \cdot p_{CT} = 1$ | $U_{CT} = u_{CT}(0) \cdot p_{CT} = 1$ |
| Traffic with Susp. QM | Outcomes with probabilities | Suspend QM Traffic = 0%, $p_{ST} = 1$ | Suspend QM Traffic = 0%, $p_{ST} = 1$ | $p_{ST}(x) = \frac{1}{\sigma\sqrt{2\pi}} e^{-\frac{(x-\mu)^2}{2\sigma^2}}$, $\mu = 30$, $\sigma = 4$ |
| | Utility score | $U_{ST} = u_{ST}(0) \cdot p_{ST} = 1$ | $U_{ST} = u_{ST}(0) \cdot p_{ST} = 1$ | $U_{ST} = \int_{-\infty}^{\infty} u_{ST}(x) \cdot p_{ST}(x) \cong 0.7975$ |
| Expected Utility for Actions | | $U^{SC} = 0.81679$ | $U^{LR} = 0.79921$ | $U^{SM} = 0.7995$ |

Fig. 4 (cont'd)

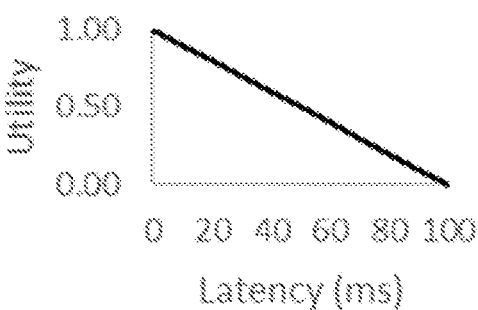
Utility of Latency (mMTC)
$$u_{LT}(x) = \begin{cases} 1 - 0.01x, & 0 \le x > 100 \\ 0, & x \ge 100 \end{cases}$$
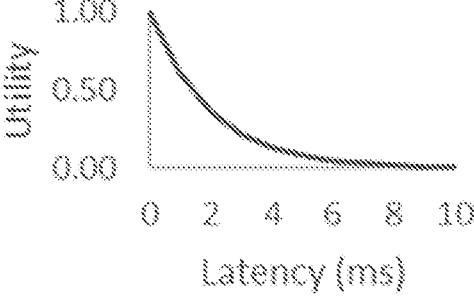
Utility of Latency (URLCC)
$$u_{LT}(x) = \begin{cases} e^{-0.5x}, & 0 \le x > 10 \\ 0, & x \ge 10) \end{cases}$$
Fig. 5

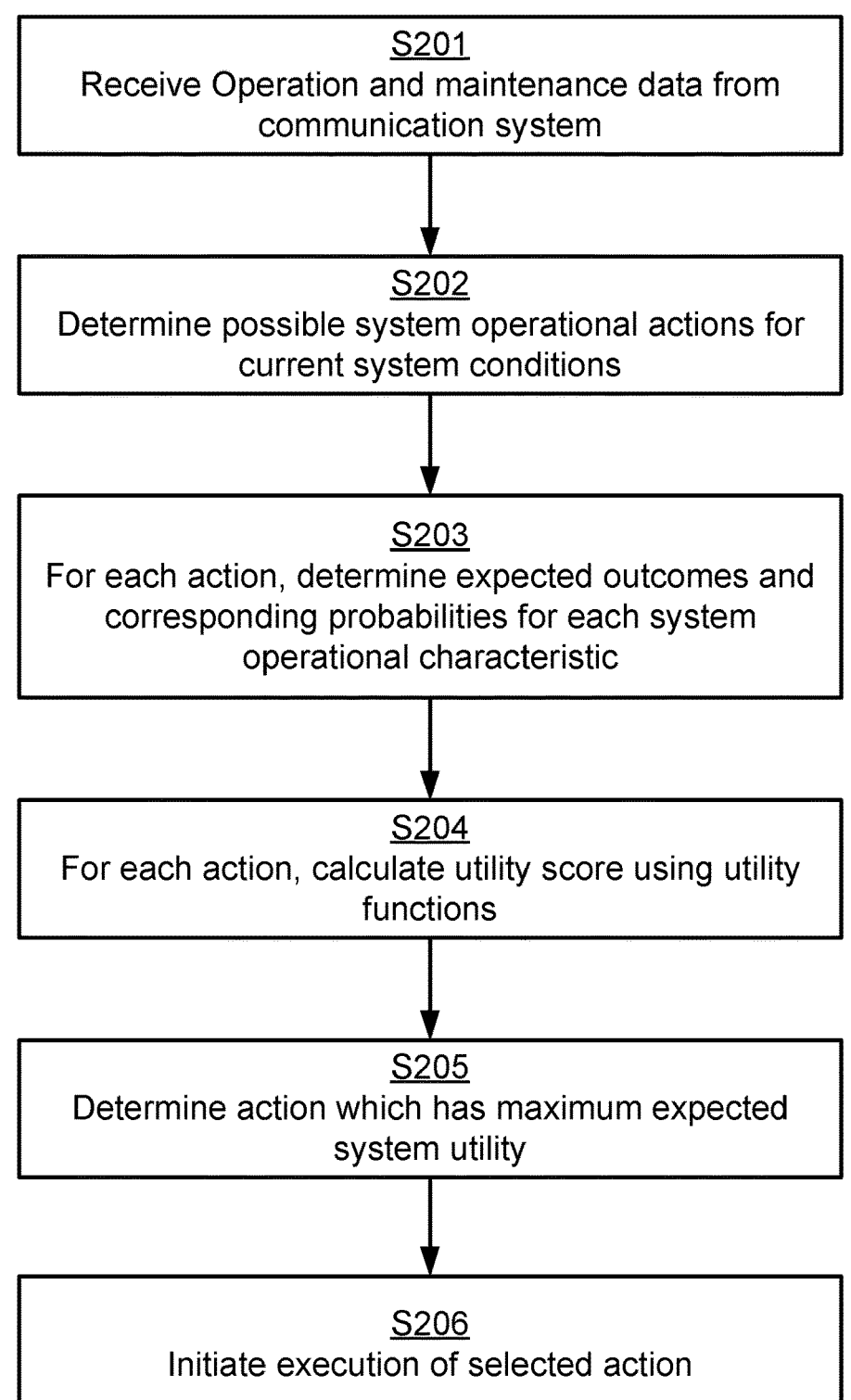

S201
Receive Operation and maintenance data from communication system

S202
Determine possible system operational actions for current system conditions

S203
For each action, determine expected outcomes and corresponding probabilities for each system operational characteristic

S204
For each action, calculate utility score using utility functions

S205
Determine action which has maximum expected system utility

S206
Initiate execution of selected action

Fig. 6

METHOD, SYSTEM CONTROLLER, AND COMPUTER PROGRAM FOR SELECTION OF SYSTEM OPERATIONAL ACTION IN A COMMUNICATION SYSTEM

CROSS REFERENCE TO RELATED APPLICATIONS

This application is a 35 U.S.C. § 371 national stage application of PCT International Application No. PCT/IN2021/051014 filed on Oct. 26, 2021, the disclosure and content of which is incorporated by reference herein in its entirety.

TECHNICAL FIELD

Embodiments presented herein relate to a method, a system controller, a computer program, and a computer program product for selection of system operational action in a communication system.

BACKGROUND

Communication systems comprise system entities, such as network elements, that perform various functions in relation to traffic flows (e.g., voice calls, data usage etc.) in the communication systems. It is system operation critical that such system entities are always running and operating as per system operation expectations. Otherwise, this might lead to system operation losses or failures. For example, one such system entity is the Online Charging System (OCS) that responsible for authorizing the consumption of resources such as minutes, data, pre-paid balances etc. in the communication system. The OCS should respond to requests, or other types of signaling, from other system entities within defined time ranges so that the consumption of resources for a given user in the communication system can be granted.

Communication systems are commonly dimensioned, with respect to number of system entities, performance requirements of the system entities, data storage, etc. for a certain traffic load expected by the communication system. As an example, traffic load not only varies within a day (e.g., in terms of peak time versus off peak time) but also varies between days (e.g., in terms of holiday period versus working period, weekends versus weekdays, etc.). On the one hand, dimensioning system entities, or even the communication system as a whole, for peak traffic load results in higher complexity of the communication system as well as higher costs for network deployment, but where the communication system is mostly under-utilized during the off-peak time. On the other hand, dimensioning system entities, or even the communication system as a whole, for average traffic load results in that some traffic needs to be rejected due to overload or the risk that some system entities, or even the communication system as a whole, might crash due to overload.

For measuring the system performance, communication systems have various performance targets which could be measured as key performance indicators (KPIs). Commonly, a team of operation and maintenance staff is in charge of monitoring these KPIs and of deciding the best corrective/preventive system operational action, or actions, in a given situation. If the value of one or more KPIs deviates (or is predicated to deviate) from their acceptable range, one or more corrective/preventive system operational actions might be executed in the communication system to bring back (or to keep) the KPIs within the acceptable range.

There is thus a need for a right, or fair, balance of all possible system operational actions.

SUMMARY

An object of embodiments herein is to address the above issues in order to achieve a right, or fair, balance of all possible system operational actions.

According to a first aspect there is presented a method for selection of system operational action in a communication system. The method is performed by a system controller. The method comprises obtaining operation and maintenance data identifying current system conditions in the communication system. The method comprises determining, based on the obtained operation and maintenance data, a set of system operational actions that are candidates to be performed. Each of the system operational actions, for given system conditions, impacts system operational characteristics of the communication system according to quantitative outcomes with associated probabilities. Each of the system operational actions provides a system operation utility in the communication system. The method comprises determining, as a function of the quantitative outcomes and the associated probabilities of impacting the system operational characteristics for the given system conditions, a utility score for each of the system operational actions. The method comprises selecting the system operational action with highest utility score. The method comprises initiating execution of the selected system operational action in the communication system.

According to a second aspect there is presented a system controller for selection of system operational action in a communication system. The system controller comprises processing circuitry. The processing circuitry is configured to cause the system controller to obtain operation and maintenance data identifying current system conditions in the communication system. The processing circuitry is configured to cause the system controller to determine, based on the obtained operation and maintenance data, a set of system operational actions that are candidates to be performed. Each of the system operational actions, for given system conditions, impacts system operational characteristics of the communication system according to quantitative outcomes with associated probabilities. Each of the system operational actions provides a system operation utility in the communication system. The processing circuitry is configured to cause the system controller to determine, as a function of the quantitative outcomes and the associated probabilities of impacting the system operational characteristics for the given system conditions, a utility score for each of the system operational actions. The processing circuitry is configured to cause the system controller to select the system operational action with highest utility score. The processing circuitry is configured to cause the system controller to initiate execution of the selected system operational action in the communication system.

According to a third aspect there is presented a system controller for selection of system operational action in a communication system. The system controller comprises an obtain module configured to obtain operation and maintenance data identifying current system conditions in the communication system. The system controller comprises a determine module configured to determine, based on the obtained operation and maintenance data, a set of system operational actions that are candidates to be performed. Each of the system operational actions, for given system conditions, impacts system operational characteristics of the communication system according to quantitative outcomes with associated probabilities. Each of the system operational actions provides a system operation utility in the communication system. The system controller comprises a determine module configured to determine, as a function of the quantitative outcomes and the associated probabilities of impacting the system operational characteristics for the given system conditions, a utility score for each of the system operational actions. The system controller comprises a select module configured to select the system operational action with highest utility score. The system controller comprises an initiate module configured to initiate execution of the selected system operational action in the communication system.

According to a fourth aspect there is presented a computer program for selection of system operational action in a communication system, the computer program comprising computer program code which, when run on a system controller, causes the system controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects result in a right, or fair, balance being achieved between all possible system operational actions.

Advantageously, these aspects make it possible to clearly express different system operational characteristics explicitly in terms of system operation utility. Then, based on the probability (calculated dynamically) for different possible system operational actions to achieve the maximum system operation utility, the best possible system operational action is selected.

Advantageously, the dynamicity of these aspects provides the ability to adapt to changes in system operation utilities and preferences for different system operational characteristics as the situation changes.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2 and 6 are flowcharts of methods according to embodiments;

FIG. 3 schematically illustrates system operation utility functions of some system operational characteristics according to an embodiment;

FIG. 4 schematically illustrates calculation of utility score according to an embodiment;

FIG. 5 schematically illustrates system operation utility functions of relating to latency for two service categories according to an embodiment;

DETAILED DESCRIPTION

Figure 1:
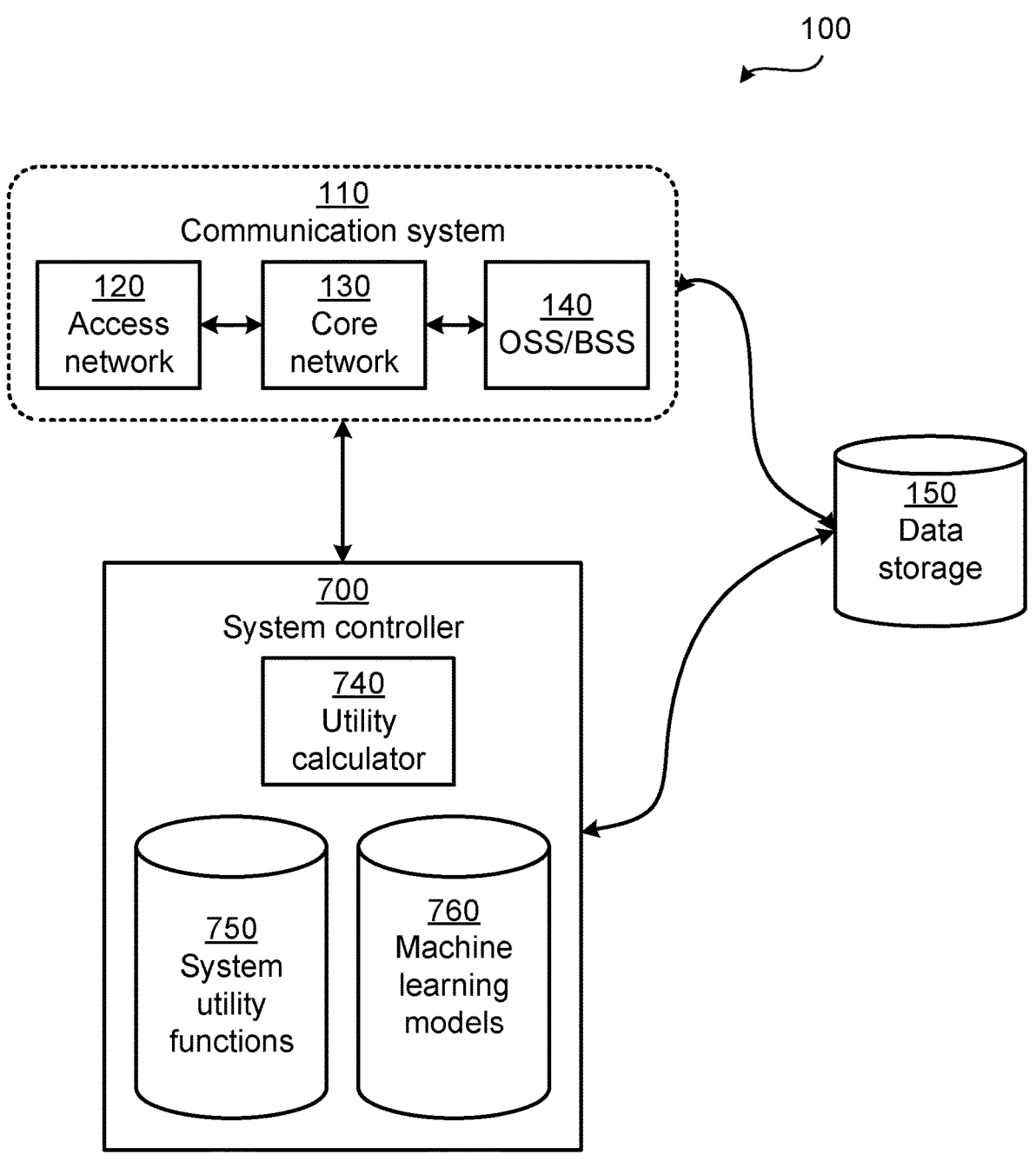
FIG. 1 is a schematic diagram illustrating a system according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

In some telecommunication systems, system operational characteristics, such as availability, latency, throughput, etc. for different types of communication services differ significantly for different types of telecommunication service categories such as enhanced mobile broadband (eMBB) services, ultra-reliable low-latency (URLLC) services, and massive machine-type communication (mMTC) services. However, even for the same service category, the system operational characteristic demands may vary significantly from one type of use-cases to another and even from one enterprise system customer to another.

As a first example, a first enterprise sending sensor data from Internet of Things (IoT) devices can afford comparatively high latency and comparatively less reliability but a second enterprise sending health related data from a wearable device sensor requires comparatively low latency and comparatively high reliability.

As a second example, events generated by IoT devices may create a much larger amount of traffic at certain times of the day (such as midnight) than at other certain times of the day in some cases.

As a third example, it might be mandatory to allocate more resources dynamically to a network slice dedicated for critical transportation needs than for a network slice serving mobile broadband users.

As a fourth example, for a first service provider offering services based on edge computing, low latency might be of highest priority, whilst for a second service provider offering eMBB services, throughput might be of highest priority.

As disclosed above there is a need for a right, or fair, balance of all possible system operational actions.

Further in this respect, a system operational action might affect multiple conflicting system operational characteristics. For example, load regulation might reduce the latency, but at the same time, some traffic would also be rejected, thus impacting end user experience. For some system operational actions, there may be certain costs of taking an action.

For example, scaling of the communication system might have various associated costs in terms of additional hardware needed to be added, replaced, or upgraded, etc. Performance KPIs are also associated with some system operation value or satisfaction from the perspective of the communication service providers (CSPs), such as mobile network operators (MNOs). The performance KPIs might further have system operation preferences from the CSP perspective. For example, a first MNO having access to extra hardware and software, may prefer latency not to be compromised over the cost of scaling, whilst a second MNO having limited access to hardware and software might accept a higher latency.

Current techniques evaluate only given system conditions, and do not evaluate possible system operational actions. If there are multiple possible system operational actions, it is not evaluated which system operational action, or actions, would yield highest system performance, such as highest system operation utility, considering multiple conflicting system operational characteristics. For a system operational action, there can be one or more outcomes with respective probabilities. As a non-limiting illustrative example, assume that scaling-up of a communication system, brings down latency to 12 ms with 60% probability, and to 10 ms with 40% probability. Current techniques do not consider uncertainties in the outcomes. Over a period, there may be various changes. For example, the effectiveness of a system operational action might increase or decrease, or the system operation preferences of various KPIs may change. Current techniques are based on fixed, static, logic and rules for selecting the system operational action, or actions, and might therefore need to be manually adjusted to accommodate changes.

Decisions on system operational actions are commonly manually made. Techniques also exist for procedures which automatically decides which system operational actions to be performed based on the KPI values. Commonly, these procedures are configured according to logic, or rules, that based on values of the KPIs decide the best system operational actions in each situation.

Decisions of operation made by a mobile network operator might relate to different attributes (e.g., latency, rejected traffic, risk due to traffic with suspended quota management, monetary cost etc.). These attributes are termed here as system operational characteristics. Different mobile network operators may have preferences on different system operational characteristics. For example, a mobile network operator with a high network deployment may prefer that latency is not to be compromised over the cost of scaling. For example, a mobile network operator with a lower network deployment may prefer to have a more balanced approach between latency and scaling.

There may be multiple possible actions to select from (e.g., scaling, load regulation, suspend quota management etc.) to manage operation in a communication system. These actions are termed here as system operational actions. A system operational action may impact multiple system operational characteristics which may result in conflicting system utilities. For example, a system operational action for load regulation may reduce the latency and thus causing system operation utility gain, and at the same time, some traffic would be rejected and thus causing system operation utility loss.

There may be uncertainties in outcomes. Uncertainty is also an impact factor to be considered. As a non-limiting illustrative example, assume that the current latency is 30 ms, and that there are two possible system operational actions. A first system operational action reduces the latency to 20 ms with 80% probability and to 25 ms with 20% probability. A second system operational action reduces the latency to 15 ms with 20% probability and to 25 ms with 80% probability. Even though the second system operational action has better outcome (15 ms) than the first system operational action (20 ms), the probability is lower (20% instead of 80%). Considering there is much higher probability of reducing the latency to 20 ms, the first system operational action might be selected.

If there are multiple possible system operational actions impacting multiple system operational characteristics and there are uncertainties in outcomes, utility theory can be applied to evaluate the system operational actions. The system operational action which has maximum expected system operation utility (i.e., the system operational action which is expected to provide maximum system operation satisfaction) can then be selected and applied.

FIG. 1 is a schematic diagram illustrating a system 100 where embodiments presented herein can be applied. The system 100 comprises a communication system 110. In turn, the communication system 110 comprises an access network 120, a core network 130, and an operational support system/business support system (OSS/BSS) 140. The communication system 110 is operatively connected to a system controller 700. The system controller 700 is configured to collect various data from the communication system 110 and to determine a system operational action expected to yield maximum system operation utility. The system controller 700 comprises a utility calculator 740 configured to calculate the system operation utility of each system operational characteristics by using respective system operation utility function and to calculate overall utility for each system operational action. For this purpose, the utility calculator 740 has access to a storage 750 of system operation utility functions and a storage 760 of machine learning (ML) models. The storage 750 of system operation utility functions contains system operation utility functions for system operational characteristics and a multi-characteristic system operation utility functions. The storage 760 of machine learning models contains machine learning models to predicts outcomes with corresponding probabilities. The system controller 700 and the communication system 110 have access to, and can exchange data with, a data storage 150. The data storage 150 contains historical data for machine learning model training. It may also store operation and maintenance data from the communication system 110 as well as calculated system utilities and suggested system operational actions in various situations.

Figure 2:
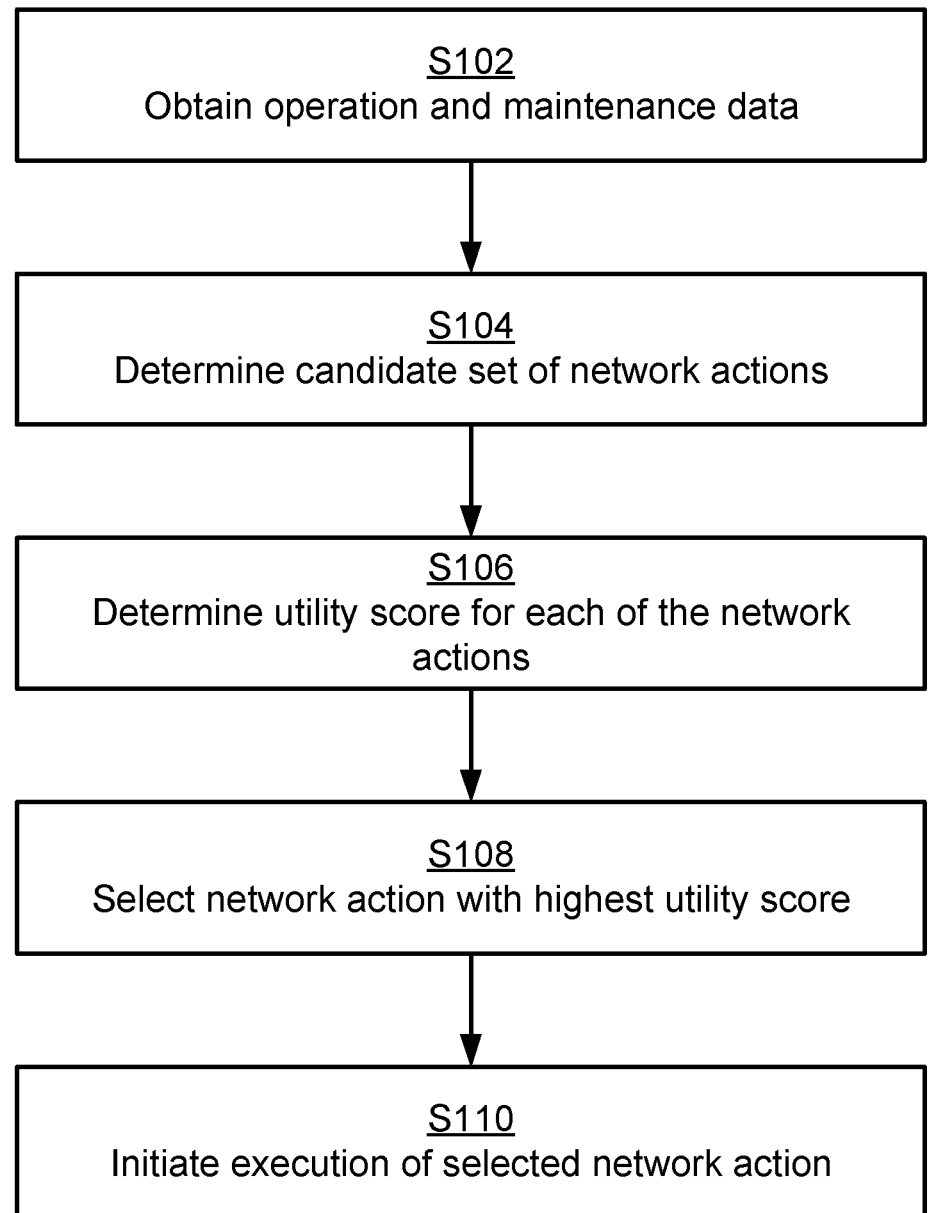

FIG. 2 is a flowchart illustrating embodiments of methods for selection of system operational action in a communication system 110. The methods are performed by the system controller 700. The methods are advantageously provided as computer programs 920.

S102: The system controller 700 obtains operation and maintenance data identifying current system conditions in the communication system 110.

S104: The system controller 700 determines, based on the obtained operation and maintenance data, a set of system operational actions that are candidates to be performed. Each of the system operational actions, for given system conditions, impacts system operational characteristics of the communication system 110 according to quantitative outcomes with associated probabilities. Each of the system operational actions provides a system operation utility in the communication system 110.

S106: The system controller 700 determines a utility score for each of the system operational actions. The utility score is determined as a function of the quantitative outcomes and the associated probabilities of impacting the system operational characteristics for the given system conditions.

S108: The system controller 700 selects the system operational action with highest utility score.

S110: The system controller 700 initiates execution of the selected system operational action in the communication system 110.

In accordance with this method, if there are multiple possible system operational actions impacting multiple system operational characteristics and there are uncertainties in outcomes, utility theory can be applied to evaluate the system operational actions. The system operational action which has maximum expected system operation utility (i.e., the system operational action which is expected to provide maximum system operation satisfaction) should be selected and applied.

Embodiments relating to further details of selection of system operational action in a communication system 110 as performed by the system controller 700 will now be disclosed.

In some non-limiting examples, the operation and maintenance data comprises any of: performance counters, alarms, log files, or any combination thereof, collected from the communication system 110. In some non-limiting examples, the operation and maintenance data relates to available resources in the communication system, such as total computational processing power or capacity, total storage capacity. In some non-limiting examples, the operation and maintenance data relates to resource utilization, such as computational processing power or capacity usage, storage capacity utilization. In some non-limiting examples, the operation and maintenance data relates to network request-response counters—total request served, total request rejected, total request pending, total request served per network service, total request rejected per network service, and/or total request pending per network service. In some non-limiting examples, the operation and maintenance data relates to status of various background processes (completed, and/or ongoing). In some non-limiting examples, the operation and maintenance data relates to performance counter relating to any of: latency, throughput (e.g., in terms of number of transactions per second).

In some non-limiting examples, each of the system operational actions pertains to any of: resource scaling, load regulation, resource balancing, suspend quota management, regulate quota allocation, request prioritization, pause non-critical background jobs, or any combination thereof, in the communication system 110.

In some non-limiting examples, the system operational characteristics pertain to any of: throughput, latency, reliability, user service category, rejected traffic rate, suspended quota management traffic, energy consumption, operational cost, resource (e.g., processing, and/or storage) utilization, number of service level agreement breaches, service availability, network coverage.

In some non-limiting examples, the quantitative outcomes of the system operational characteristics pertain to any of: level of throughput, level of latency, level of reliability, available user service categories, level of rejected traffic rate, amount of suspended quota management traffic, amount of energy consumed in the communication system 110.

Aspect of how to identify all system operational characteristics and how to model their system operation utility function will now be disclosed in detail.

In some embodiments, the system operation utility is a function of the quantitative outcomes and the associated probabilities. In some embodiments, the utility score represents an expected value of the system operation utility for the system operational characteristics for the given system conditions. Assume without loss of generality that there are N system operational characteristics denoted $X_1, X_2, \ldots, X_N$ and that $u_{X_1}(x), u_{X_2}(x), \ldots, u_{X_N}(x)$ are their respective system operation utility functions. The utility score of an operational characteristic can be calculated as the sum of the utility of the outcomes multiplied by their corresponding probability. Assume that for an operational characteristic X, there are 1 different outcomes $x=\{x_1, x_2, \ldots, x_1\}$ with corresponding probabilities $p=\{p_1, P_2, \ldots, P_l\}$. The utility score $U_X$ of the operational characteristic X can then be calculated as:

$$U_X = f_X(x, p) \tag{1}$$

where $f_X$ is the utility score function of the operational characteristic X.

For a discrete-valued operational characteristic:

$$U_X = \sum_{q=0}^{l} u_X(x_q) \cdot p_q \tag{1a}$$

For a continuous-valued operational characteristic:

$$U_X = \int_{-\infty}^{\infty} u_X(x) \cdot p_X(x) dx \tag{1b}$$

where, $p_X(x)$ is the probability density function of the operational characteristic X.

Possible outcomes and corresponding probabilities can be calculated in real time or non-real time. Hence, in some embodiments, the quantitative outcomes and the associated probabilities have values that are computed in real time or non-real time.

The outcomes can be estimated by applying machine leaning such as a neural network, or alternatively can be derived from historical data. A machine learning model, or neural network, can be trained using training data in terms of latency, throughput (transactions per second), total traffic served, traffic served per network service, total traffic rejected, traffic rejected per network service, total traffic request pending, traffic request pending per network service, total traffic with suspended quota management, traffic with suspended quota management per network service, number of service level agreement breaches, available resources (e.g., in terms of processing, and/or storage), resource (e.g., processing, and/or storage) utilization, status of background jobs, date and time, day of the week (e.g., weekday, weekend, or special day), special event, subscribers base related parameters (e.g., total subscribers, total subscribers per network service). In the absence of training data for machine learning and historical data, the outcomes and corresponding probabilities can be provided by domain experts.

A system operational characteristic can be one-dimensional or multi-dimensional. If a system operational characteristic is multi-dimensional, this means that the system operation utility of the operational characteristic depends on the combination of values of all dimensions rather than individual values for each dimension.

Aspect of how to model a multi-operational characteristic system operation utility function which takes all system operational characteristics and their preferences into consideration and returns an overall utility score will now be disclosed in detail.

In some embodiments, when there are at least two types system operational characteristics per system operational action, an individual utility score is determined for each type of system operational characteristics, and wherein the expected value of the system operation utility for a system operational action is determined as a function of all the individual utility scores. Assume that $f_{MUF}$ is a multi-characteristic system operation utility function:

$$U^A = f_{MUF}\left(U_{X_1}, U_{X_2}, \ldots, U_{X_N}\right) \qquad (2)$$

where $U^A$ is the utility score of the system operational action A, and $U_{X_1}(x)$, $U_{X_2}(x)$, ..., $U_{X_N}(x)$ are the utility scores of system operational characteristics $X_1$, $X_2$, ..., $X_N$.

In some aspects, the multi-characteristic system operation utility functions are assumed to be additive, i.e.:

$$U^A = \sum_{i=0}^{N} k_i U_{X_i}$$

In some aspects, the multi-characteristic system operation utility functions are assumed to be multiplicative, i.e.:

$$1 + kU^A = \prod_{i=0}^{N}\left(1 + k_i U_{X_i}\right)$$

Here, $k$, $k_0$, $k_1$, $k_2$, ..., $k_N$ are scaling parameters which are determined based on system operation preferences for the operational characteristic. Hence, in some embodiments, each of the system operational characteristics is weighted with its own weighting factor when the utility score is determined.

Aspect of how to select the system operational action which has maximum expected system operation utility will now be disclosed.

Assume without loss of generality that there are M system operational actions $A_1$, $A_2$, ..., $A_M$ and that $U^{A_1}$, $U^{A_2}$, ..., $U^{A_M}$ are their corresponding calculated utility scores. Then the selected system operational action can be calculated as:

$$\text{system operational action} = \overset{\text{argmax}}{A}\left(U^{A_1}, U^{A_2}, \ldots, U^{A_M}\right) \qquad (3)$$

A system operational action can be either atomic (pertaining to one single operational characteristic) or composite (pertaining to two or more operational characteristics). For example, load regulation can be considered as an atomic system operational action, rejecting some of the network traffic to reduce the load. An example of composite system operational action could be {load regulation and suspend quota management} together, in which, some of the traffic will be rejected and quota management will be suspended for some of the traffic.

A system operational action may have some limits or thresholds. For example, load regulation by 5% traffic rejection or load regulation by 10% traffic rejection. These two examples can be modeled as two different system operational actions and can be evaluated along with other possible system operational actions.

There can be counter system operational actions corresponding to the system operational actions. For example, "turn off load regulation" is the counter system operational action of the system operational action "switch on load regulation". If load regulation is switched on, "turn on load regulation" can become one of the possible system operational actions. This system operational action can be evaluated along with other possible system operational actions to determine if turning off the load regulation is expected to give maximum, or at least improved, system operation utility.

In some embodiments, initiating execution of the selected system operational action involves sending a trigger to an access network node and/or an OSS/BSS node in the communication system 110 to execute the selected system operational action.

In some situations, not performing any new system operational action may be the best option. For example, when all performance indicators are within their target ranges, are not expected to be deviated, no new system operational action or counter system operational action needs to be performed. Not performing any new system operational action can be modeled as one of the available system operational actions. A utility score of not performing any new system operational action can also be calculated. If the utility score is the maximum for not performing any new system operational action, no system operational action needs to be performed.

Calculation of utility score for system operational actions and selection of a system operational action can be done at some trigger (e.g., when the latency is more than 30 ms) or at regular time interval (e.g. every 30 seconds) or any combination thereof. In some embodiments the method is thus executed either at regular time intervals, or upon the system controller 700 having received information that triggers execution of the method, or a combination thereof.

Aspects of system operational characteristics will now be disclosed.

As a non-limiting and illustrative example, assume that there are four system operational characteristics; latency ($X_{LT}$), rejected traffic ($X_{RT}$), monetary cost ($X_{CT}$) and suspended quota management traffic ($X_{ST}$). Assume that their corresponding system operation utility functions are $u_{LT}$, $u_{RT}$, $u_{CT}$ and $u_{ST}$. FIG. 3 illustrates the system operation utility function of these System operational characteristics. The outputs of the system operation utility functions are normalized on a scale from 0 to 1, where the best case has the utility of 1 and the worst case has the utility of 0. In some embodiments, the system operation utility for each of the system operational characteristics thus takes a value within a normalized interval.

Consideration of each of the four system operational characteristics in this example will be disclosed next.

Utility score for latency: Any mobile network operators would like the system entities to respond to the communication network as quickly as possible. In the present example, a latency of 0 ms is considered as the best case and has a utility score of 1. While a latency of 50 ms or more is considered as the worst case and has a utility score of 0.

Utility score for rejected traffic: Traffic rejection may cause revenue loss and customer dissatisfaction. In the present example, 0% traffic rejection is considered as the best case and has a utility score of 1. Traffic rejection of 50% or more is considered as the worst case and has a utility score of 0.

Utility score for cost: Any mobile network operator would like to keep the monetary cost as low as possible. In the present example, additional cost (e.g., infrastructure cost, software license fee) of USD 0 is considered as the best case and has a utility score of 1. An additional cost of USD 2500 or more is considered as the worst case and has a utility score of 0.

Utility score for suspended quota management traffic: There is a risk that for a traffic request, for which the network resource (e.g., voice, data) consumption is allowed without quota check, i.e., quota management is suspended, corresponding credits could not be collected later. As the number of traffic requests with suspended quota management is increased, corresponding monetary risk is also increased. In the present example, 0% suspended quota management traffic (i.e., quota is checked for all traffic requests) is considered as the best case and has a utility score of 1. Traffic with suspended quota management of 60% or more is considered as the worst case and has a utility score of 0.

Assume that a multi-characteristic system operation utility function has additive form. The system operation utility of a system operational action $U^A$ can then be represented as:

$$U^A = k_{LT}U_{LT} + k_{RT}U_{RT} + k_{CT}U_{CT} + k_{ST}U_{ST} \qquad (4)$$

where $U_{LT}$, $U_{RT}$, $U_{CT}$ and $U_{ST}$ are the utility scores for the system operational characteristics latency, rejected traffic, cost and suspended quota management traffic, respectively. Assume that the corresponding scaling factors are:

$$k_{LT} = 0.4, k_{RT} = 0.3, k_{CT} = 0.1 \text{ and } k_{ST} = 0.2$$

This can be interpreted as, relatively, latency has highest preference and cost has lowest preference.

Assume that in a scenario (e.g., relating to system overload) there are three possible system operational actions: scaling, load regulation and suspend quota management. Consideration of each of the three system operational actions in this example will be disclosed next.

Scaling: Additional system entities will be added to the communication system. This might reduce the latency in the communication system. This will come at an additional monetary cost (e.g., infrastructure cost, license fee). There is no traffic rejection and quota management suspension in the system operational action.

Load Regulation: some network traffic requests will be rejected. This might reduce the latency in the communication system. There is no additional monetary cost and quota management suspension in the system operational action.

Suspend Quota Management: Quota management will be suspended for some of the network traffic requests. This might reduce the latency in the communication system. There is no additional monetary cost and traffic rejection in the system operational action.

All the above-listed three system operational actions might reduce the latency, but the impact might be different for the different three system operational actions.

FIG. 4 illustrates the calculation of utility score. For each system operational action, the figure shows expected outcomes with corresponding probabilities and utility score per system operational characteristic. There might be uncertainty in outcomes. For example, the system operational action scaling will reduce the latency, but there are different possible outcomes (e.g., 15 ms, 16 ms, 14 ms etc.) with different probabilities. In the present example, different possible outcomes with corresponding probabilities are depicted by probability density functions. There may be certain impacts on the system conditions in the communication system. For example, the system operational action scaling does not result in any traffic being rejected. This means that there is certain outcome of 0% traffic rejection with the probability of 1. FIG. 4 also shows the calculation of utility score for each system operational characteristics for each system operational action. The last row in the figure shows the utility score of each system operational action. In the present example, the utility score of the system operational action scaling is the highest. This system operational action should be selected as it is expected to give highest system operation utility, or in other words maximum system operation satisfaction.

Aspects of changes in the utility of system operational actions as a function of change in system operation preferences will now be disclosed.

System operation preferences, which are modelled as k-factors in the multi-characteristic function, may vary in situations and deployments. System operation preferences may also be changed over a period due to many factors such that change in system operation priorities, etc. Table 1 (where QM is short for quota management) illustrates the change in utility score of system operational actions as a function of change in system operation preferences. Assuming that everything else is same, as the system operation preferences is changed, the utility scores of the system operational actions are also changed and so does the selection of system operational action based on the maximum utility score.

TABLE 1

| Change in selected action depending on changing scale factors | | | | |
|---|---|---|---|---|
| Scale factors | Scaling | Load regulation | Suspended QM | Selected action |
| $k_{LT} = 0.4$ $k_{RT} = 0.3,$ $k_{CT} = 0.1,$ $k_{ST} = 0.2$ | $U^{SC} = 0.82$ | $U^{LR} = 0.80$ | $U^{SM} = 0.80$ | Scaling |
| $k_{LT} = 0.4$ $k_{RT} = 0.2,$ $k_{CT} = 0.3,$ $k_{ST} = 0.1$ | $U^{SC} = 0.69$ | $U^{LR} = 0.84$ | $U^{SM} = 0.82$ | Load regulation |
| $k_{LT} = 0.3$ $k_{RT} = 0.3,$ $k_{CT} = 0.3,$ $k_{ST} = 0.1$ | $U^{SC} = 0.72$ | $U^{LR} = 0.82$ | $U^{SM} = 0.86$ | Suspended QM |

Aspects of change in the utility of system operational actions as a function of change in the system operation utility of the system operational characteristics will now be disclosed.

The system operation utility of the system operational characteristics may vary in situations and system deployments. System utilities may also be changed over a period due to factors such as change in system operation priorities, updates in network infrastructure (faster operation, higher network coverage, etc.), etc.

Table 2 illustrates the change in utility score of system operational actions on the change of utility for the system operational characteristic latency between two cases; case (a) and case (b).

$$\text{For case } (a)\text{: } u_{LT}(x) = \begin{cases} 1-0.02x, & \text{for } 0 \le x < 50 \\ 0, & \text{for } x \ge 50 \end{cases}$$

$$\text{For case } (b)\text{: } u_{LT}(x) = \begin{cases} 1-0.01x, & \text{for } 0 \le x < 100 \\ 0, & \text{for } x \ge 100 \end{cases}$$

Assuming that everything else is same, as the utility of the system operational characteristic is changed, the utility scores of the system operational actions are also changed and so does the selection of system operational action based on the maximum utility score.

TABLE 2

| Change in utility score for different cases | | | | |
|---|---|---|---|---|
| Latency | Scaling | Load regulation | Suspended QM | Selected action |
| Case (a) | $U^{SC} = 0.69$ | $U^{LR} = 0.84$ | $U^{SM} = 0.82$ | Load regulation |
| Case (b) | $U^{SC} = 0.75$ | $U^{LR} = 0.88$ | $U^{SM} = 0.90$ | Suspended QM |

Aspects of change in the utility of system operational actions as a function of change in effectiveness of the system operational actions will now be disclosed.

Effectiveness of system operational actions may vary in situations, network deployments, etc. Effectiveness may also be changed over a period due to factors such that change in network traffic patterns, infrastructure, software releases etc. In some embodiments, the amount of impact the system operational actions have on the system operational characteristics of the communication system 110 thus changes over time. Change in effectiveness of the system operational action will cause change in outcomes and associated probabilities. For example, assume that implementation of load regulation is updated. The new load regulation implementation may produce different outcome levels and the associated probabilities. Table 3 illustrates the change in utility score of system operational actions on the change in effectiveness of the system operational action load regulation between two cases; case (a) and case (b), where $p_{RT}(x)$ is the probability density function of the level of rejected traffic and corresponding probabilities.

$$\text{For case } (a)\text{: } p_{RT}(x) = \frac{1}{\sigma\sqrt{2\pi}} e^{\frac{(x-\mu)^2}{2\sigma^2}}, \text{ where } \mu = 35, \text{ and } \sigma = 4$$

$$\text{For case } (b)\text{: } p_{RT}(x) = \frac{1}{\sigma\sqrt{2\pi}} e^{\frac{(x-\mu)^2}{2\sigma^2}}, \text{ where } \mu = 25, \text{ and } \sigma = 4$$

Change in effectiveness of the system operational action will result into the change in outcomes and corresponding probabilities. Assuming that everything else is same, as the effectiveness of the system operational action is changed, the utility scores of the system operational actions are also changed and so does the selection of system operational action based on the maximum utility score.

TABLE 3

| Change in utility score for different cases | | | | |
|---|---|---|---|---|
| Load regulation | Scaling | Load regulation | Suspended QM | Selected action |
| Case (a) | $U^{SC} = 0.72$ | $U^{LR} = 0.82$ | $U^{SM} = 0.86$ | Suspended QM |
| Case (b) | $U^{SC} = 0.72$ | $U^{LR} = 0.88$ | $U^{SM} = 0.86$ | Load regulation |

Aspects of handling user of multiple service categories will now be disclosed.

In some embodiments, to which access network node and/or an OSS/BSS node in the communication system 110 the trigger is sent depends on which system operational action is selected. In other embodiments, to which access network node and/or an OSS/BSS node the trigger is sent is independent of which system operational action is selected. In this respect, a system operational action can be triggered for multiple nodes (e.g., scale up multiple nodes), can be for a particular node (e.g., scale up only nodes of a particular type or handling a particular network function), can be for a part of node (e.g., load regulation only for a segment of customers or load regulation only for few instances). Further in this respect, some system operational actions, such as scaling, are generic and can be applied on multiple nodes. Some system operational actions are specific to a particular node (e.g., change in quota grant policy).

There can be users with different types of service categories. Some non-limiting examples of service categories are eMBB services, URLLC services, and mMTC services. Since these service categories may have different desired system operational characteristics, the corresponding system operation utilities and preferences may also be different. For example, for URLLC services very low latency is preferable, while for mMTC services, low latency is not crucial. FIG. 5 illustrates the system operation utility functions of the system operational characteristic latency for two service categories; mMTC and URLCC. For the mMTC service there is linear drop in the utility as latency increases, and for the URLLC service, there is an exponential drop in the utility as the latency increase. There can be various ways to handle traffic for different service categories. According to a first example, there can be a dedicated set of nodes for handling each service category. For example, one set of nodes for mMTC traffic and another set of nodes for URLLC traffic. In this case, system operation utility functions and system operation preferences can be configured per node or set of nodes. According to a second example, common nodes are configured for handling a mix of traffic. In this case, there might be fine-grained system operational characteristics such as latency for mMTC traffic, latency for URLLC traffic etc. and/or fine-grained system operational actions such as load regulation of mMTC traffic, load regulation of URLLC traffic. etc.

Aspects of handling of multiple user segments will now be disclosed.

A mobile network operator may group its user into various segments. For different segments, system operation may have different system utilities and preferences. In such cases, there might be different system operation utility functions and system operation preferences (k-factors) for different user segments or special users. There can be various ways to handle traffic for different subscriber segment. According to a first example, there can be a dedicated set of nodes for each user segment or for a special user. In this case, system operation utility functions and system operation preferences can be configured per node or set of nodes. According to a second example, common nodes are configured for handling a mix of user segments. In this case, there might be fine-grained system operational characteristics such that latency for retail users, latency for enterprise users etc. and/or fine-grained system operational actions such that load regulation for retail users, load regulation for enterprise users etc.

In some embodiments, the quantitative outcomes and their associated probabilities are, based on input to the system controller 700, updated over time. In this respect, utility functions, preferences, and outcomes levels and the associated probabilities of system operational characterises and multi-characteristic system operation utility functions can be updated over time, jointly or independently from each other. Any change will change the utility score of the system operational action.

FIG. 6 is a flowchart illustrating embodiments of methods for selection of system operational action in a communication system 110 based on at least some of the above disclosed embodiments, aspects, and examples.

S201: The system controller 700 receives operation and maintenance data from system entities in the communication system. The data might relate to performance counters, alarms, log files or any other information indicating current system conditions.

S202: The system controller 700 determines candidate system operational actions (e.g., scaling, load balancing, suspend quota management) for the current system conditions.

S203: For each system operational action, the system controller 700 determines expected outcomes and corresponding probabilities for each system operational characteristic (e.g., latency, rejected traffic, cost, traffic with suspended quota management). The outcomes can be certain (with a probability of 1) or uncertain (taking one of multiple values with associated probabilities).

S204: For each system operational action, the system controller 700 calculates the utility score for each system operational characteristic, and then calculates an overall utility score of the system operational action by using a multi-characteristic function.

S205: The system controller 700 determines which system operational action has maximum utility score and select this system operational action.

S206: The system controller 700 initiates execution of the selected system operational action in the communication system and thereby instructs at least one system entity in the communication system to execute the selected system operational action.

With respect to the above disclosed embodiments, aspects, and examples, instead of selecting the system operational action that has maximum expected system operation utility, i.e., the system operational action with highest utility score, the system operational action that results in minimum loss (according to some loss score) can be selected. That is, instead of maximizing a system operation utility function, a corresponding loss function could be minimized. This also implies that regrets can be modelled. For example, a traffic rejection of 0% would have no loss and a rejection of 50% or more would have maximum loss. Then, there could be a multi attribute loss function, which would take losses of all system operational characteristics and their system operation preferences into consideration and return the overall loss. The system operational action yielding a minimum loss score would then be selected.

Figure 7:
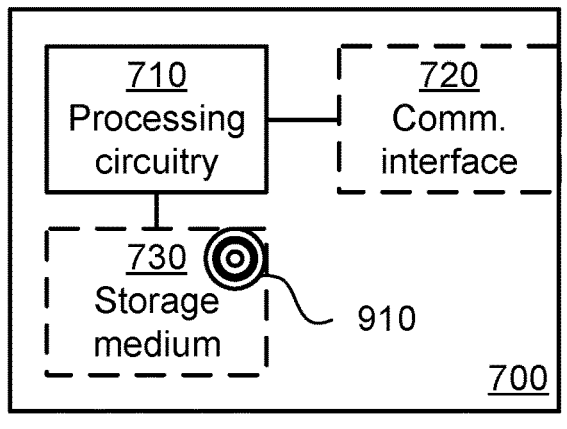
FIG. 7 is a schematic diagram showing functional units of a system controller according to an embodiment.

FIG. 7 schematically illustrates, in terms of a number of functional units, the components of a system controller 700 according to an embodiment. Processing circuitry 710 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 730. The processing circuitry 710 may further be provided as at least one application specific integrated circuit (ASIC), or field programmable gate array (FPGA). The storage medium 730 might store the storage 750 and the storage 760.

Particularly, the processing circuitry 710 is configured to cause the system controller 700 to perform a set of operations, or steps, as disclosed above. For example, the storage medium 730 may store the set of operations, and the processing circuitry 710 may be configured to retrieve the set of operations from the storage medium 730 to cause the system controller 700 to perform the set of operations. The set of operations may be provided as a set of executable instructions. The processing circuitry 710 might be configured to implement the functionality of the utility calculator 740.

Thus the processing circuitry 710 is thereby arranged to execute methods as herein disclosed. The storage medium 730 may also comprise persistent storage, which, for example, can be any single one or combination of magnetic memory, optical memory, solid state memory or even remotely mounted memory. The system controller 700 may further comprise a communications interface 720 at least configured for communications with other entities, functions, nodes, and devices. As such the communications interface 720 may comprise one or more transmitters and receivers, comprising analogue and digital components. The processing circuitry 710 controls the general operation of the system controller 700 e.g. by sending data and control signals to the communications interface 720 and the storage medium 730, by receiving data and reports from the communications interface 720, and by retrieving data and instructions from the storage medium 730. Other components, as well as the related functionality, of the system controller 700 are omitted in order not to obscure the concepts presented herein.

Figure 8:
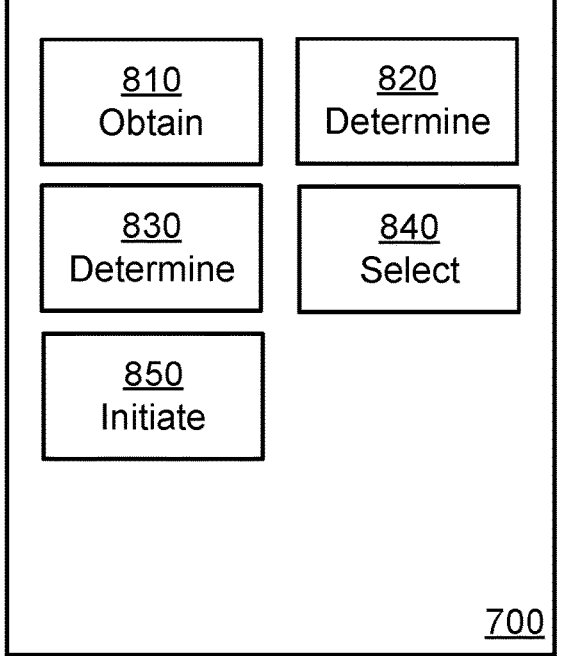
FIG. 8 is a schematic diagram showing functional modules of a system controller according to an embodiment.

FIG. 8 schematically illustrates, in terms of a number of functional modules, the components of a system controller 700 according to an embodiment. The system controller 700 of FIG. 8 comprises a number of functional modules; an obtain module 810 configured to perform step S102, a determine module 820 configured to perform step S104, a determine module 830 configured to perform step S106, a select module 840 configured to perform step S108, and an initiate module 850 configured to perform step S110. The system controller 700 of FIG. 8 may further comprise a number of optional functional modules configured to perform other actions. In general terms, each functional module 810-850 may in one embodiment be implemented only in hardware and in another embodiment with the help of software, i.e., the latter embodiment having computer program instructions stored on the storage medium 730 which when run on the processing circuitry makes the system controller 700 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 810-850 may be implemented by the processing circuitry 710, possibly in cooperation with the communications interface 720 and/or the storage medium 730. The processing circuitry 710 may thus be configured to from the storage medium 730 fetch instructions as provided by a functional module 810-850 and to execute these instructions, thereby performing any steps as disclosed herein.

A first portion of the instructions performed by the system controller 700 may be executed in a first device, and a second portion of the of the instructions performed by the system controller 700 may be executed in a second device; the herein disclosed embodiments are not limited to any particular number of devices on which the instructions performed by the system controller 700 may be executed. Hence, the methods according to the herein disclosed embodiments are suitable to be performed by a system controller 700 residing in a cloud computational environment. Therefore, although a single processing circuitry 710 is illustrated in FIG. 7 the processing circuitry 710 may be distributed among a plurality of devices, or nodes. The same applies to the functional modules 810-850 of FIG. 8 and the computer program 920 of FIG. 9.

Figure 9:
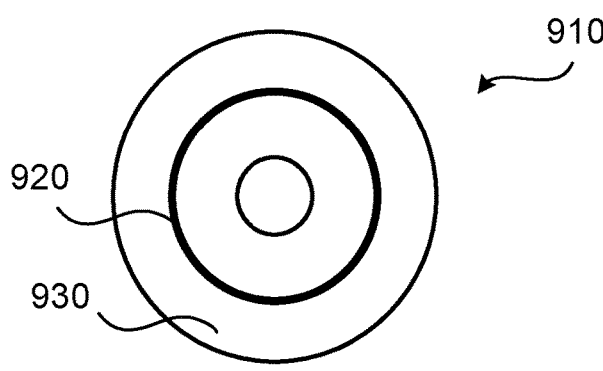
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 710 and thereto operatively coupled entities and devices, such as the communications interface 720 and the storage medium 730, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for selection of system operational action in a communication system, the method being performed by a system controller, the method comprising:

obtaining operation and maintenance data identifying current system conditions in the communication system;

determining, based on the obtained operation and maintenance data, a set of system operational actions that are candidates to be performed, wherein each of the system operational actions, for given system conditions, impacts system operational characteristics of the communication system according to quantitative outcomes with associated probabilities, and wherein each of the system operational actions provides a system operation utility in the communication system;

determining, as a function of the quantitative outcomes and the associated probabilities of impacting the system operational characteristics for the given system conditions, a utility score for each of the system operational actions;

selecting the system operational action with highest utility score; and initiating execution of the selected system operational action in the communication system, wherein initiating execution is performed after selecting the system operational action with the highest utility score, and wherein initiating execution of the selected system operational action involves sending, by the system controller, an execution trigger to an access network node and/or an OSS/BSS node in the communication system to execute the selected system operational action such that the execution trigger directly causes performance of the selected system operational action, and wherein to which access network node and/or an OSS/BSS node the execution trigger is sent is independent of which system operational action is selected.

2. The method according to claim 1, wherein the system operation utility is a function of the quantitative outcomes and the associated probabilities.

3. The method according to claim 1, wherein the utility score represents an expected value of the system operation utility for the system operational characteristics for the given system conditions.

4. The method according to claim 3, wherein, when there are at least two types system operational characteristics per system operational action, an individual utility score is determined for each type of system operational characteristics, and wherein the expected value of the system operation utility is determined as a function of all the individual utility scores.

5. The method according to claim 1, wherein each of the system operational characteristics is weighted with its own weighting factor when the utility score is determined.

6. The method according to claim 1, wherein the operation and maintenance data comprises any of: performance counters, alarms, log files, or any combination thereof, collected from the communication system.

7. The method according to claim 1, wherein each of the system operational actions pertains to any of: resource scaling, load regulation, suspend quota management, or any combination thereof, in the communication system.

8. The method according to claim 1, wherein the system operational characteristics pertain to any of: throughput, latency, reliability, user service category, rejected traffic rate, suspended quota management traffic, energy consumption.

9. The method according to claim 1, wherein the quantitative outcomes of the system operational characteristics pertain to any of: level of throughput, level of latency, level of reliability, available user service categories, level of rejected traffic rate, amount of suspended quota management traffic, amount of energy consumed in the communication system.

10. The method according to claim 1, wherein the system operation utility for each of the system operational characteristics takes a value within a normalized interval.

11. The method according to claim 1, wherein the quantitative outcomes and the associated probabilities have values that are computed in real time or non-real time.

12. The method according to claim 1, wherein the method is executed either at regular time intervals, or upon the system controller having received information that triggers execution of the method, or a combination thereof.

13. The method according to claim 1, wherein the quantitative outcomes and their associated probabilities are, based on input to the system controller, updated over time.

14. The method according to claim 1, wherein amount of impact the system operational actions have on the system operational characteristics of the communication system changes over time.

15. A system controller for selection of system operational action in a communication system, the system controller comprising processing circuitry, the processing circuitry being configured to cause the system controller to:

obtain operation and maintenance data identifying current system conditions in the communication system;

determine, based on the obtained operation and maintenance data, a set of system operational actions that are candidates to be performed, wherein each of the system operational actions, for given system conditions, impacts system operational characteristics of the communication system according to quantitative outcomes with associated probabilities, and wherein each of the system operational actions provides a system operation utility in the communication system;

determine, as a function of the quantitative outcomes and the associated probabilities of impacting the system operational characteristics for the given system conditions, a utility score for each of the system operational actions;

select the system operational action with highest utility score; and initiate execution of the selected system operational action in the communication system, wherein initiating execution is performed after selecting the system operational action with the highest utility score, and wherein initiating execution of the selected system operational action involves sending, by the system controller, an execution trigger to an access network node and/or an OSS/BSS node in the communication system to execute the selected system operational action such that the execution trigger directly causes performance of the selected system operational action, and wherein to which access network node and/or an OSS/BSS node the execution trigger is sent is independent of which system operational action is selected.

16. A system controller for selection of system operational action in a communication system, the system controller comprising:

an obtain module configured to obtain operation and maintenance data identifying current system conditions in the communication system;

a first determine module configured to determine, based on the obtained operation and maintenance data, a set of system operational actions that are candidates to be performed, wherein each of the system operational actions, for given system conditions, impacts system operational characteristics of the communication system according to quantitative outcomes with associated probabilities, and wherein each of the system operational actions provides a system operation utility in the communication system;

a second determine module configured to determine, as a function of the quantitative outcomes and the associated probabilities of impacting the system operational characteristics for the given system conditions, a utility score for each of the system operational actions;

a select module configured to select the system operational action with highest utility score; and an initiate module configured to initiate execution of the selected system operational action in the communication system, wherein initiating execution is performed after selecting the system operational action with the highest utility score, and wherein initiating execution of the selected system operational action involves sending, by the system controller, an execution trigger to an access network node and/or an OSS/BSS node in the communication system to execute the selected system operational action such that the execution trigger directly causes performance of the selected system operational action, and wherein to which access network node and/or an OSS/BSS node the trigger is sent is independent of which system operational action is selected.

17. The system controller according to claim 16, further being configured to perform operations of:

obtaining operation and maintenance data identifying current system conditions in the communication system;

determining, based on the obtained operation and maintenance data, a set of system operational actions that are candidates to be performed, wherein each of the system operational actions, for given system conditions, impacts system operational characteristics of the communication system according to quantitative outcomes with associated probabilities, and wherein each of the system operational actions provides a system operation utility in the communication system;

determining, as a function of the quantitative outcomes and the associated probabilities of impacting the system operational characteristics for the given system conditions, a utility score for each of the system operational actions;

selecting the system operational action with highest utility score; and initiating execution of the selected system operational action in the communication system, wherein the system operation utility is a function of the quantitative outcomes and the associated probabilities.

* * * * *